United States Patent
Huang

(10) Patent No.: US 6,711,642 B2
(45) Date of Patent: Mar. 23, 2004

(54) METHOD AND CHIPSET FOR SYSTEM MANAGEMENT MODE INTERRUPT OF MULTI-PROCESSOR SUPPORTING SYSTEM

(75) Inventor: Chung-Ching Huang, Taipei Hsien (TW)

(73) Assignee: Via Technologies, Inc., Taipei Hsien (TW)

( * ) Notice: Subject to any disclaimer, the term of this patent is extended or adjusted under 35 U.S.C. 154(b) by 494 days.

(21) Appl. No.: 09/878,882

(22) Filed: Jun. 11, 2001

(65) Prior Publication Data

US 2002/0156958 A1 Oct. 24, 2002

(30) Foreign Application Priority Data

Apr. 18, 2001 (TW) ........................ 90109255 A

(51) Int. Cl.[7] ............... G06F 13/24; G06F 3/00; G06F 9/455
(52) U.S. Cl. ............... 710/260; 710/3; 703/25
(58) Field of Search ............... 710/60, 3, 73; 709/318; 712/31, 229; 713/1; 703/25, 24

(56) References Cited

U.S. PATENT DOCUMENTS

| | | | | |
|---|---|---|---|---|
| 5,729,760 A | * | 3/1998 | Poisner ........................ | 710/3 |
| 5,796,984 A | * | 8/1998 | Pearce et al. ............... | 703/24 |
| 6,209,083 B1 | * | 3/2001 | Naini et al. ................ | 712/229 |
| 6,272,618 B1 | * | 8/2001 | Tyner et al. ................ | 712/31 |
| 6,282,601 B1 | * | 8/2001 | Goodman et al. ........... | 710/260 |
| 6,480,914 B1 | * | 11/2002 | Hsieh .......................... | 710/73 |
| 6,571,206 B1 | * | 5/2003 | Casano et al. ................ | 703/25 |
| 6,636,962 B1 | * | 10/2003 | Sun et al. ..................... | 713/1 |
| 2002/0099893 A1 | * | 7/2002 | Nguyen et al. ............. | 710/260 |
| 2002/0120801 A1 | * | 8/2002 | Bennett et al. ............. | 710/260 |

* cited by examiner

Primary Examiner—Glenn A. Auve
Assistant Examiner—Christopher E. Lee
(74) Attorney, Agent, or Firm—J.C. Patents

(57) ABSTRACT

A method and a chipset for supporting a system management mode interrupt of a multi-processor system. While the central processing is accessing the specified input/output port defined by the chipset, the chipset detects the specified input/output port at the peripheral component interface bus and extracts the trap data to store into the chipset. Therefore, while entering the system management mode, a first central processing unit executes a proper operation according to the trap data of the chipset, and a second central processing unit stands by until the proper operation is completed by the first central processing unit. Thus, when the central processing units in a multi-processor system enters the system management mode, the first central processing unit can access the parameters from chipset even though the system management interrupt is induced by the second central processing unit and the parameters are stored in the second CPU's state dump area. In this way, the error, that the first central processing unit does not know which parameters stored in the first central processing unit's state dump area or the second central processing unit's state dump area should be accessed, can be completely resolved.

17 Claims, 2 Drawing Sheets

METHOD AND CHIPSET FOR SYSTEM MANAGEMENT MODE INTERRUPT OF MULTI-PROCESSOR SUPPORTING SYSTEM

CROSS-REFERENCE TO RELATED APPLICATION

This application claims the priority benefit of Taiwan application serial no. 90109255, filed on Apr. 18, 2001.

BACKGROUND OF THE INVENTION

1. Field of the Invention

The invention relates in general to a method and a chipset for system management mode interrupt, and more particularly, to a method and a chipset for system management mode interrupt of a multi-processor supporting system.

2. Description of the Related Art

System management mode (SMM) is a special function of the central processing unit (CPU), such as a Pentium processor, used in a modern computer system. SMM provides the system designer with a method to control the computer via a firmware, such as a basic input output system (BIOS). SMM is also transparent to the operation system (OS). SMM has the following properties.

1. SMM has the system management interrupt (SMI) hardware interface. The chipset comprises a SMIOUT# pin. When the chipset enables the SMIOUT#, the central processing unit enters the system management mode to execute the system management interrupt handler routine prepared by the BIOS.
2. SMM has a private and safe memory space called system management random access memory (SMRAM) in which the SMI handler routine codes and the state dump area of the central processing unit are located. After entering the SMM mode, the firmware routine or the BIOS handler routine obtains parameter contents such as EAX and EBX of the CPU register from this state dump area while SMI occurs.
3. The system management mode base (SMBase) has a default address and can be reconfigured. In the multi-processor system, different CPUs can possess theirs specific SMBases.
4. The resume (RSM) command is used to leave SMM, and then CPU executes the next routine code when the SMI occurs.

BIOS can execute many system management interrupt handler routines under SMM to support functions that OS does not or does not fully supports. For example:

1. Support for a USB apparatus such as a keyboard or a mouse in OS DOS, or NT4.0. Neither OS DOS nor NT 4.0 has a USB driver to handle the USB apparatus and controller. Therefore, the chipset has to compromise with the BIOS to provide the SMI hardware interrupt interface and the handler routine to trap IO port (60h or 64h) of the conventional keyboard controller (such as 8042). Then BIOS can emulate the functions of the USB apparatus and the controller. Thus, under OS DOS and NT 4.0, the USB apparatus can be used without the USB driver.
2. Support for the advanced power management (APM) apparatus. BIOS provides OS with INT15 and software SMI to manage the power source to save power and implement a power saving mode operation.
3. Support for the special function of motherboard. Many motherboard designers design special functions and use SMI handler routine to implement special hardware operation.

The interrupt trap of the I/O port (IO trap) is the key source of SMI and can be used to support early AP or game (under DOS or NT 4.0) to use newer apparatus such as an USB keyboard or mouse. Conventional keyboard controller (8042) has two IO ports, a command port 64h and a data port 60h. Some early application programs (AP) or games (under DOS or NT 4.0) intended to control the early 8042 keyboard and mouse directly. However, the early AP and games were unable to use any USB apparatus because the USB controller is different from the early keyboard controller (8042). However, it is proven that the USB apparatus is more and more popular and widely applied. Fortunately, via SMI handler, the chipset can trap the command port 64h or the data port 60h to generate SMIOUT# to the CPU. Thus, the SMI handler of the BIOS can use program to control the USB keyboard. Via the IO trap mechanism, the USB apparatus can be used normally in an AP or game developed under early OS DOS and NT 4.0 Windows operation system without USB driver.

Such SMI apparatus can operate normally in a single CPU system. However, when applied in a multi-processor system under an operation system such as NT 4.0 Windows operation system, remediless errors may occur.

For example, in a two-CPU system and under the NT 4.0 Windows operation system that uses USB keyboard, when SMI occurs, these two CPUs store all the register data into the individual state dump area in SMRAM and enter the system management mode. In the system management mode, only one CPU (the first CPU hereinafter) executes SMI handler routine. The other CPU (the second CPU hereinafter) is in a loop and stands by for the first CPU to complete SMI handler routine and to inform the other CPU to execute RSM command, so that these CPUs are retrieved to the states before SMI, and then these CPUs can execute their individual previous next commands.

If, before entering the SMI mode, the second CPU is executing an NT 4.0 Windows operation system program to access the IO port of the conventional keyboard controller (for example, Assembly codes of OUT 60h, AL or OUT 64h, AL command), the south bridge chip detects the IO port of the conventional keyboard controller at the peripheral component interface (PCI) bus to extract the command data, address data and the byte enable data, and stores these data in the register thereof. When the system is not actually connected to the conventional keyboard, the south bridge chip enables a system management interrupt signal (SMIOUT#), so that the first and second CPUs enter the system management mode simultaneously. Meanwhile, if the SMI handler routine is executed by the second CPU, the second CPU can then execute according to the command, address, the extracted byte enable data, and the IO data in the state dump area of the second CPU (the parameters of AL, AX, or EAX register). However, the SMI handler routine is in fact executed by the first CPU. The first CPU cannot recognize whether the IO data (parameters) are stored in the state dump area of the first or the second CPU. When the SMI handler routine is executed under these circumstances, the first CPU may operate un-correctly to cause unexpected results.

Therefore, without knowing which CPU is executing access of the command port 64h or the data port 60h, the SMIOUT# generated by the chipset is given to all the CPUs. As a result, all the CPUs enter the SMM. As the first CPU executes the SMI handler routine, other CPUs stand by. However, as the first CPU does not know whether the IO data (parameters) is stored in its state dump area or in the second CPU's state dump area, then errors may occur.

SUMMARY OF THE INVENTION

The invention provides a method and a chipset for system management mode interrupt of a multi-processor supporting system, to resolve the parameter access problem occurring in the system management mode operation of a multi-processor system, and to avoid system errors.

In the method for system management mode interrupt of a multi-processor supporting system, the multi-processor supporting system comprises a plurality of CPUs, a PCI bus and a chipset. The CPUs comprises a first CPU and a second CPU. When any of the CPUs is executing a software program to access a specified IO port defined by the chipset, the chipset detects the specified IO port at the PCI bus and extracts the trap data to store in the chipset. The chipset enables the system management interrupt signal. The first and the second CPUs enter the system management mode according to the system management interrupt signal. The first CPU executes a proper operation according to the trap data stored in the chipset, while the second CPU waits until the proper operation is complete. After the proper operation is complete, the second CPU is informed by the first CPU. The first and second CPUs then return to their original state, the state before entering the system management mode, to execute a previous next command individually. In one embodiment of the invention, the software program is a program executed under NT 4.0 Windows operation system.

The invention further provides a chipset of multi-processor supporting system. The multi-processor supporting system comprises a plurality of CPUs and a PCI bus. The CPUs comprises a first CPU and a second CPU. The chipset comprises a first register set, used to store the command data, the address data and the byte enable data, and a second register used to store the IO data (parameters). When any of the CPUs is executing a software program to access a specified IO port defined by the chipset, the chip detects the specified IO port at the PCI bus and extracts the command, address and byte enable data to store in the first register set. Meanwhile, the chipset further extracts the IO data (parameters) to store in the second register. The chipset then enables the system management interrupt signal, so that the first and the second CPUs enter the system management mode. The first CPU executes a proper operation according to the command data, the address data, the byte enable data and the IO data stored in the first and the second registers. After the first CPU executes the proper operation, the second CPU is informed. The first and the second CPUs return to their original state, the state before entering the system management mode, and execute a previous next command respectively.

In the invention, when the specified IO port defined by the chipset is accessed by the system, it is detected by the chipset at the PCI bus. Meanwhile, a trap data is extracted by and stored in the chipset. Therefore, when the multi-processor system is in the system management mode, the CPUs can access the correct data (parameters) from the chipset to execute a proper operation. The system can thus operate normally.

Both the foregoing general description and the following detailed description are exemplary and explanatory only and are not restrictive of the invention, as claimed.

DESCRIPTION OF THE PREFERRED EMBODIMENTS

Figure 1:
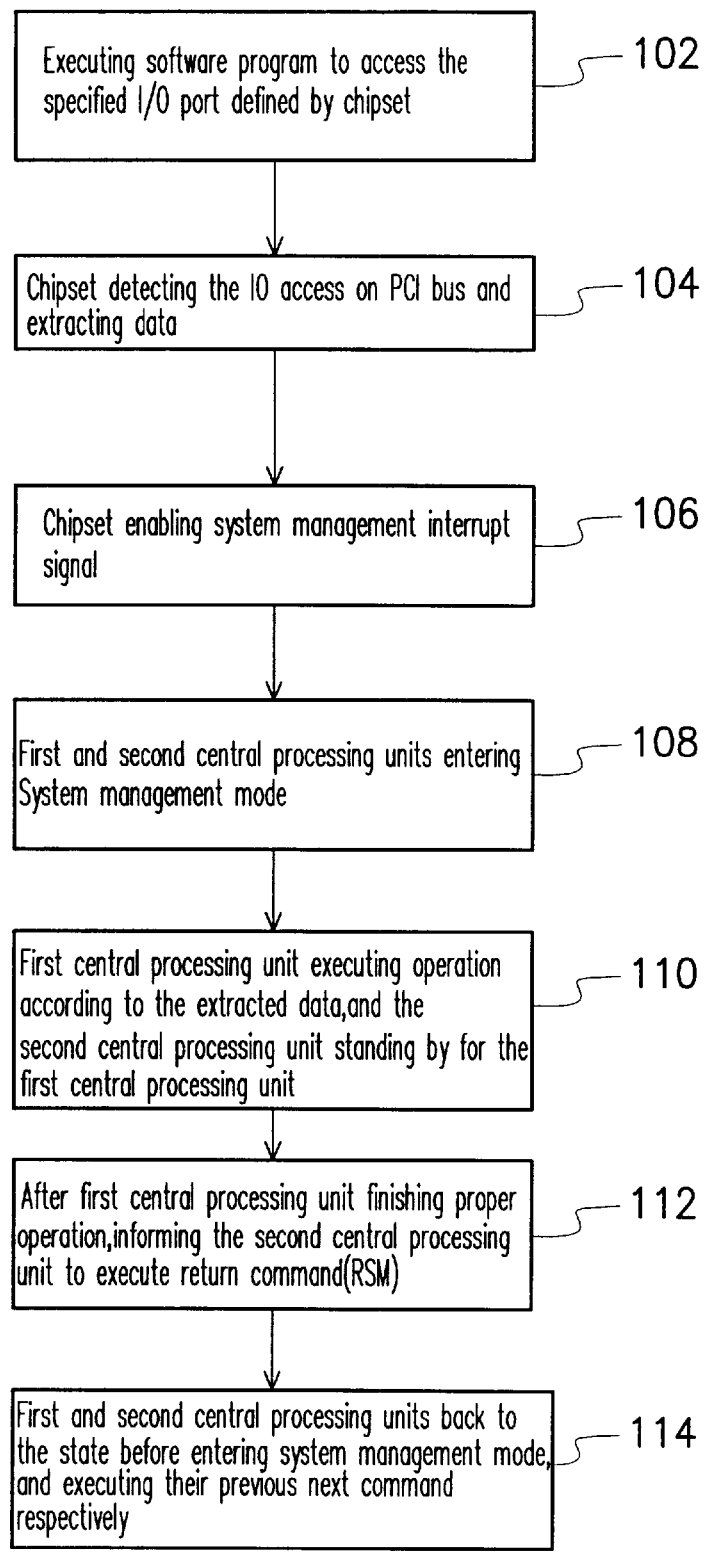
FIG. 1 is a flow chart showing the method of system management mode interrupt of a multi-processor system.

FIG. 1 shows the method of system management mode interrupt for a multi-processor system. The multi-processor system comprises at least a plurality of central processing units (CPUs), for example, two Pentium CPUs, a peripheral component interface (PCI) bus, and the chipset provided by the invention. The multiprocessor system comprises at least a first CPU and a second CPU, for example, a CPU1 and a CPU2.

In step 102, any of the CPUs is executing a software program to access the specified IO port defined by the chipset (according to the embodiment, the specified IO port includes a conventional keyboard controller IO port). For example, either one of the two Pentium CPUs is executing an NT 4.0 program to access the command port 64h or the data port 60h of the keyboard controller. In step 104, the chipset detects the IO port of the conventional keyboard controller at the PCI bus, and extracts a trap data (including a command data, an address data, a byte enable data, and an IO data (parameter) to store in the chipset. For example, the chipset detects the command port 64h or the data port 60h at the PCI bus and extracts a trap data stored in the chipset.

In step 106, the chipset enables the system management interrupt signal, for example, the SMIOUT# signal. In step 108, the first and the second CPUs enter the system management mode according to the system management interrupt signal. For example, the CPU1 and CPU2 enter SMM according to SMI#. In step 110, the first CPU executes a proper operation (including an operation of a SMI handler routine) according to the trap data stored in the chipset. The second CPU stands by until the first CPU completes the proper operation. For example, the CPU1 executes the proper operation according to the trap data in the chipset, while the CPU2 waits until the proper operation is complete. In step 112, when the first CPU finishes the proper operation, it informs the second CPU to leave SMM mode and then the first CPU also leave SMM mode. For example, after finishing the proper operation, the CPU1 informs the CPU2 to execute a RSM command, and then the CPU1 executes the RSM command. In step 114, the first and second CPUs return to their original state, the state before entering the system management mode, and each of the CPUs executes a previous next command. For example, CPU1 and CPU2 return to the states prior to SMM according to the RSM command, and execute a previous next command.

Figure 2:
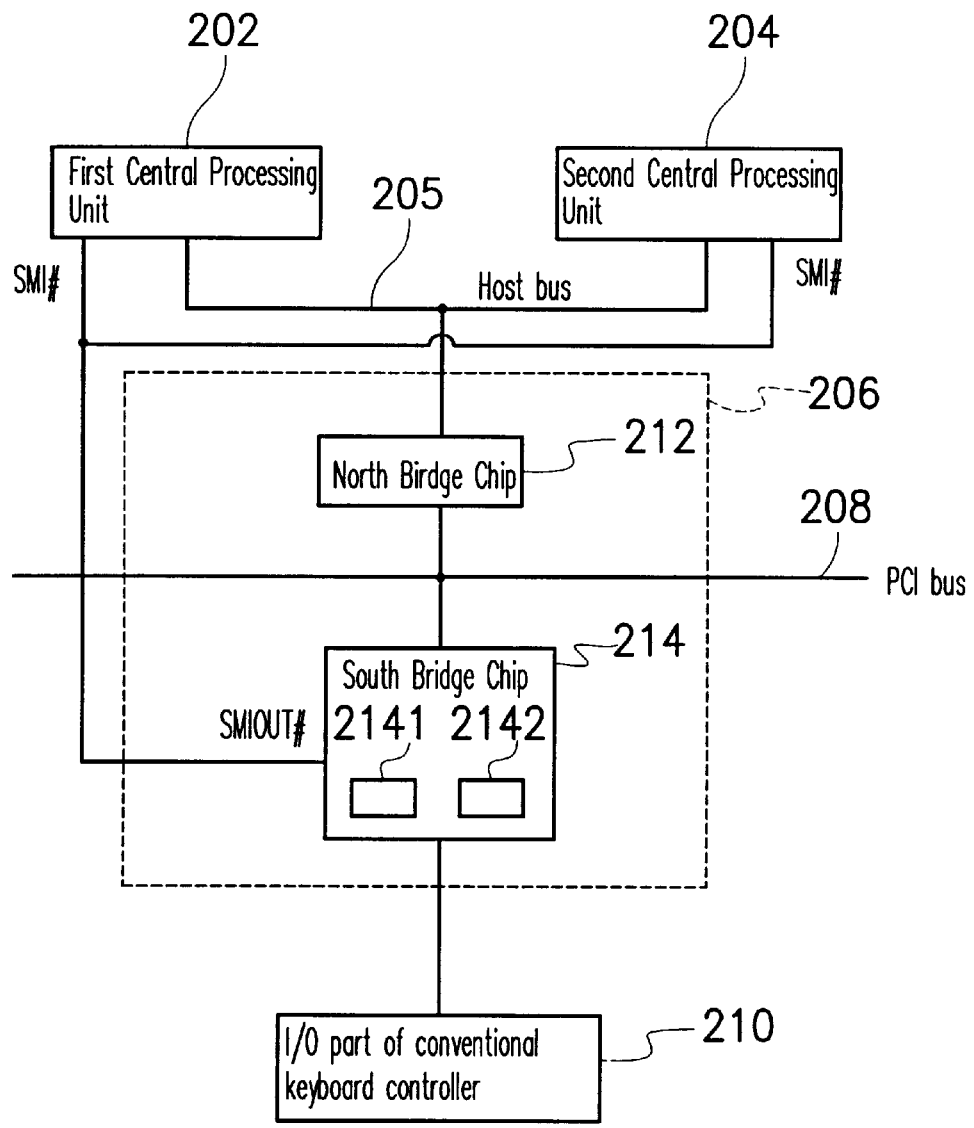
FIG. 2 is a block diagram showing an embodiment of a multi-processor supporting system according to the invention.

Referring to FIG. 2, a block diagram of a multi-processor supporting system is illustrated. In FIG. 2, the multi-processor supporting system comprises at least a first CPU 202, a second CPU 204, a chipset 206, a PCI bus 208 and a specified IO port 210 defined by the chipset 206. In this embodiment, the specified IO port includes an IO port of a conventional keyboard controller, as an example. The chipset 206 comprises a north bridge chip 212 and a south bridge chip 214. The south bridge chip 214 further comprises a first register set 2141 to store the command data, the address data and the extracted byte enable data, and a second register 2142 to store the IO data (parameter) previously stored in the state dump area of CPU that accesses specific chipset defined IO ports. The interrupt control terminals SMI# of the first CPU 202 and the second CPU 204 are both coupled to the interrupt control terminal SMIOUT# of the south bridge 214. In addition, the CPU Host bus 205 is coupled to the north bridge chip 212, the first CPU 202 and the second CPU 204. The PCI bus 208 is coupled to the south bridge chip 214 and the north bridge chip 212, while the south bridge chip 214 is further coupled to the IO port 210 of the conventional keyboard controller.

The first CPU 202 and the second CPU 204 include Pentium series CPUs. When the first CPU 202 executes an NT 4.0 Windows operation system program to access the IO port 210 of the conventional keyboard controller, the south bridge chip 214 detects the IO port 210, and extracts the command, address and byte enable data to store in the first register set 2141. The IO data (parameter) is also extracted thereby and stored in the second register 2142. Since the system is not really connected to a conventional keyboard, when the chipset 206 enables a system management interrupt signal, the first and second CPUs 202 and 204 enter the system management mode simultaneously. The first CPU 202 executes a proper operation according to the command data, the address data and byte enable data stored in the first register set 2141 and the IO data stored in the second register 2142. For example, the software program gives a reset command to the keyboard controller. However, the USB controller does not recognize the reset command to reset the USB keyboard. Meanwhile, the chipset 206 finds out that IO port (60h or 64h) of the conventional keyboard controller is accessed, so that the first and second CPUs enter the system management mode at the same time. The first CPU 202 executes the SMI handler routine according to the trap data to reset the USB keyboard. The second CPU 204 stands by until this proper operation. When the first CPU 202 finishes the proper operation and informs the second CPU 204 to execute the return command (RSM), the first CPU then executes a return command (RSM). In this way, the first and second CPUs return to their original state, the state before entering the system management mode, and then execute previous next commands respectively. Thus, the NT 4.0 Windows operation system program can control the USB keyboard.

When the second CPU 204 executes an NT 4.0 window program to access the IO port 210 of the conventional keyboard controller, the south bridge 214 detects IO port 210 of the keyboard controller at the PCI bus. The south bridge 214 further extracts the command data, the address data and the byte enable data to store to the first register set 2141, and the IO data (parameter) to the second register 2142. The chipset 206 then enables a system management interrupt signal SMIOUT# to allow the first and second CPUs 202 and 204 to enter a system management mode. The first CPU 202 executes a proper operation according to the command data, the address data and the byte enable data stored in the first register set 2141 and the IO data stored in the second register 2142. For example, the software program gives a reset command to the keyboard controller, but the USB controller does not recognize the reset command to reset the USB keyboard. At present, the control chip 206 recognizes that the IO port 210 (60h or 64h) of the conventional keyboard controller is accessed, such that the first and the second CPUs 202 and 204 enter the system management mode simultaneously. Meanwhile, the first CPU 202 executes the SMI handler routine according to the trap data to reset the USB keyboard, and the second CPU 204 has to stand by until the first CPU 202 finishes the proper operation. After the first CPU 202 executing the proper operation, the first CPU 202 informs the second CPU 204 to execute the return command (RSM), then the first CPU executes the return command (RSM). In this way, the first and second CPUs leave the system management mode according to the return command (RSM) and execute previous next commands individually. Whether the first or the second CPU is executing an NT 4.0 Windows operation system program to access the IO port of the conventional keyboard, the BIOS handler routine can obtain the correct parameter to allow the NT 4.0 Windows operation system program to control the USB keyboard properly without USB driver.

It is appreciated that people skilled in the art may modify the number of the CPUs to more than two. In addition, the first and second registers 2141 and 2142 can be installed in the integral north-south bridge chip with SMIOUT# pin. Also, the specified IO port defined by the chipset can be integrated into the south bridge chip directly. The PCI bus need not be located between the north and south bridge chips, but can also be coupled to the south bridge chip only, without affecting the characteristic of the invention.

The invention comprises the following advantages:

1. When the system is in the system management mode interrupt of the multi-processor system, the CPU obtains the correct parameters from the chipset to avoid errors.
2. By comparing the extracted data in the chipset, which CPU accesses the specified IO port defined by the chipset causing the generation of the SMM interrupt can be determined.
3. The system stability is enhanced.

Other embodiments of the invention will appear to those skilled in the art from consideration of the specification and practice of the invention disclosed herein. It is intended that the specification and examples to be considered as exemplary only, with a true scope and spirit of the invention being indicated by the following claims.

What is claimed is:

1. A method of system management mode interrupt for a multi-processor supporting system, wherein the multi-processor supporting system comprises a plurality of central processing units, a peripheral component interface bus, and a chipset, wherein the central processing units further comprise a first central processing unit and a second central processing unit, the method comprising:

when any of the central processing units is executing a software program to access a specified IO port defined by the chipset, detecting the specified IO port and extracting a trap data to store in the chipset;

enabling a system management interrupt signal by the chipset;

the first and second central processing units entering a system management mode according to the system management interrupt signal;

executing an operation according to the trap data of the chipset by the first central processing unit; and the first central processing unit returning to a previous state and executing a previous next command.

2. The method according to claim 1, further comprising:

the second central processing unit standing by until the first central processing finishes the proper operation;

informing the second central processing unit after the first central processing unit finishes performing the proper operation; and the second central processing unit returning to the previous state and executing a previous next command.

3. The method according to claim 1, wherein the trap data comprises a command data, an address data, a byte enable data and an IO data.

4. The method according to claim 3, wherein the trap data is stored in a plurality of registers of the chipset.

5. The method according to claim 4, wherein the registers comprise at least:

a first register set, to store the command data, the address data and the byte enable data; and a second register, to store the IO data.

6. The method according to claim 1, wherein the software program comprises a program executed in an NT 4.0 Windows operation system.

7. The method according to claim 1, wherein the proper operation comprises a system management mode handler routine.

8. The method according to claim 1, wherein the IO data comprises a parameter of an AL register.

9. The method according to claim 1, wherein the IO data comprises a parameter of an AX register.

10. The method according to claim 1, wherein the IO data comprises a parameter of an EAX register.

11. A chipset of a multi-processor supporting system, the multi-processor supporting system comprising a plurality of central processing units and a peripheral component interface bus, the central processing units comprising at least a first and a second central processing units, the chipset comprising:

a first register set, to store a command data, an address data and a byte enable data; and a second register, to store an IO data;

wherein when the central processing units are executing a software program to access a specified IO port defined by the chipset, the chipset detects the specified IO port and extracts the command data, the address data and the byte enable data to the first register set and the IO data to the second register, and enables a system management interrupt signal to allow the first and the second central processing units to enter a system management mode, the first central processing unit executes a proper operation according to the command data, the address data, the byte enable data of the first register set and the IO data of the second register, and after executing the proper operation, the first central processing unit returns back to the previous state and executes a previous next command.

12. The chipset according to claim 11, wherein the second central processing unit waits until the first central processing unit finishes executing the proper operation and informs the second central processing unit, whereupon the second central processing unit returns to the previous state and executes a previous next command.

13. The chipset according to claim 11, wherein the software program comprises a software executed under an NT 4.0 Windows operation system.

14. The chipset according to claim 11, wherein the proper operation includes a system management mode handler routine.

15. The chipset according to claim 11, wherein the IO data comprises a parameter of an AL register.

16. The chipset according to claim 11, wherein the IO data comprises a parameter of an AX register.

17. The chipset according to claim 11, wherein the IO data comprises a parameter of an EAX register.

* * * * *